Sept. 8, 1970   C. W. HARRISON ET AL   3,527,642
PROCESS FOR CONVERTING WASTE TO HIGHER DIGESTIVE NUTRIENTS
Filed Jan. 3, 1967   2 Sheets-Sheet 2

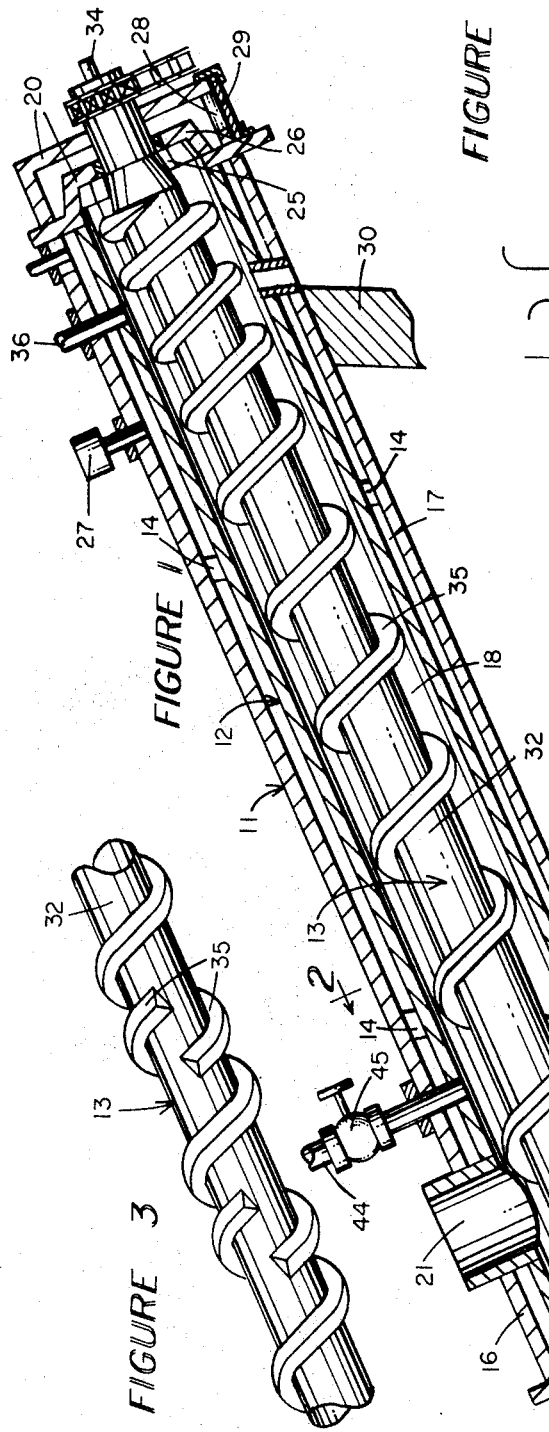
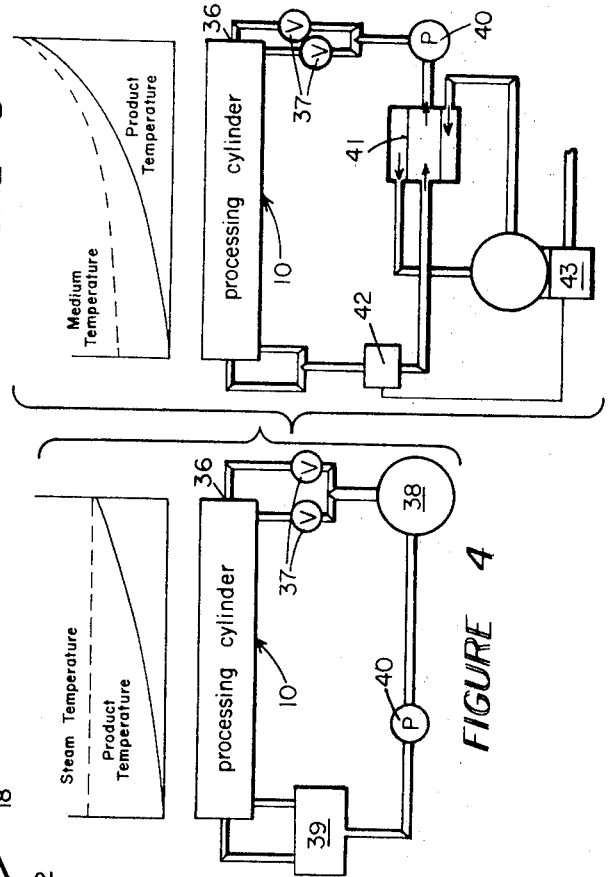
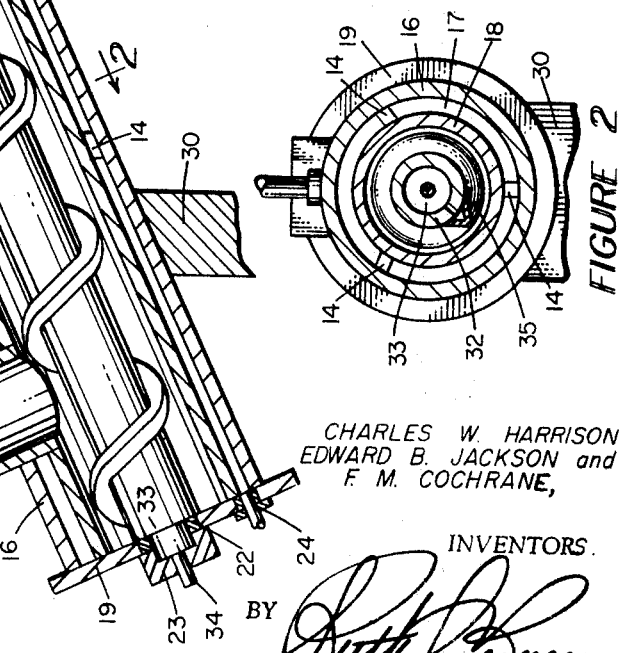

CHARLES W. HARRISON,
EDWARD B. JACKSON and
F. M. COCHRANE,
INVENTORS
BY
ATTORNEY.

3,527,642
PROCESS FOR CONVERTING WASTE TO
HIGHER DIGESTIVE NUTRIENTS

Charles W. Harrison, R.R. 1, Box 50, Pasco, Wash.
99301; Edward B. Jackson, 514 Symons, Richland,
Wash. 99352; and Fred M. Cochrane, 406 N. Underwood, Kennewick, Wash. 99336
Filed Jan. 3, 1967, Ser. No. 606,921
Int. Cl. A23k 1/04, 1/10, 1/14
U.S. Cl. 99—7           6 Claims

ABSTRACT OF THE DISCLOSURE

Vegetable and animal wastes are converted by a heating process to form a higher nutritive animal food. Waste material is mixed and masticated during passage through an elongate heated cylindrical chamber by an inefficient auger rotating in the chamber. The auger has increasing pitch in the direction of product travel to cause greater compaction and increased heat in the product during transit through the chamber to prevent excessive carbonization. The process destroys pesticides, herbicides and other contaminents in the raw material.

---

Our invention relates generally to both a process and apparatus for converting certain vegetable and animal waste into useful nutrient products and more particularly to such a process that converts such waste through a particular cooking procedure requiring particular apparatus, in combination with other additive ingredients, into a highly nutritive food product for use especially as an animal feed.

Heretofore waste materials of both vegetable and animal origin have come to be used as food products for either animal or human consumption. Such waste generally must be processed from its normally occurring crude form to be suitable for such food use, and various processes have evolved for so doing. It has heretofore been learned that in general if such product be cooked sufficiently with temperatures generally above the boiling point of water, the resultant product has a higher nutritive value than the initial product because of chemical and physical changes in components. The cooking also serves to aid in dehydration of the entire mass and in sterilizing it from unwanted microorganisms of various sorts and removing chemical contaminants, especially pesticides and herbicides. In dealing with such waste food products the various processes have evolved for particular waste substances, each process being largely specific for a particular substance because of the many and varied problems of an individual nature encountered.

With this background in mind, the instant invention seeks to provide appropriate cooking apparatus and an associated process for making a useful animal food from ingredients including sugar beet pulp waste, potato culls and waste and blood and slaughter-house offal. In so doing it is:

A principal object of our invention to provide a useful food product of processed nutrient value higher than crude value, from ingredients including sugar beet waste, potato culls and waste, and slaughter-house blood and offal by a cooking process that allows for continuous operation.

A further object of our invention to provide such a process that permits dehydration of contained or additive crude sugars, molasses or similar sacrides without charing to foul the apparatus or batch process limitations.

A further object of our invention to provide an auger actuated, angularly disposed tunnel-type cooking mechanism that increases product compaction and consequent heat transfer through the product in its course through the chamber, so that maximum temperatures are reached over a relatively limited area and a consequently limited period of time.

A further object of our invention to create a process of the nature aforesaid that is adapted to destroy by physical means pesticides, herbicides, and other deleterious biological and chemical substances during its operation.

A further object of our invention to provide such process that destroys the viability of noxious weed seeds so that such seeds may be used as a food product without danger of later vegetative establishment upon deposition from an animal consuming the product.

A further object of our invention to provide such a process that may use as raw materials dehydrated waste products capable of independent storage for long periods of time before processing.

A still further object of our invention to provide apparatus with an inefficiently conveying auger that mixes components during processing to provide an ultimate homogeneous product and one that aids in masticating the product during processing to at least partially relieve the animal consumer from this burden.

A still further object of our invention to provide such process that may include the selective partial carbonization of some components to provide a product having activated charcoal to adsorb gases formed in the animal digestive process and relieve subsequent bloat, founder and the like.

A still further object of our invention to provide such a product that can carry various nutritive and biologic additives such as nitrogen, especially in the form of urea, mineral supplements, medications and the like.

A still further object of our invention to provide such process and apparatus that is of a new and novel design, of simple and economic manufacture and operation, of durable and stable nature, and that is well adapted to the uses and purposes for which intended.

These and other objects of our invention will become apparent from consideration of the following specification and accompanying drawings which form a part of this application. In carrying out the objects of our invention, however, it is to be understood that its essential features are susceptible of change in design and arrangement with only one preferred practical embodiment being illustrated and specified, as required.

In the accompanying drawings, wherein like numbers of reference refer to similar parts throughout:

FIG. 1 is an orthographic vertical cross-sectional view through the tunnel cooking apparatus of our invention, showing its parts, their configuration and relationship.

FIG. 2 is a vertical cross-sectional view of the invention of FIG. 1 taken on the line 2—2 on FIG. 1 in the direction of the arrows thereon.

FIG. 4 is a diagrammatic representation, in normal symbology, of the apparatus for heating our cooking tunnel by steam.

FIG. 5 is a similar diagrammatic representation of the apparatus for heating our cooking tunnel by some high temperature heat transferring fluid.

Figure 6:
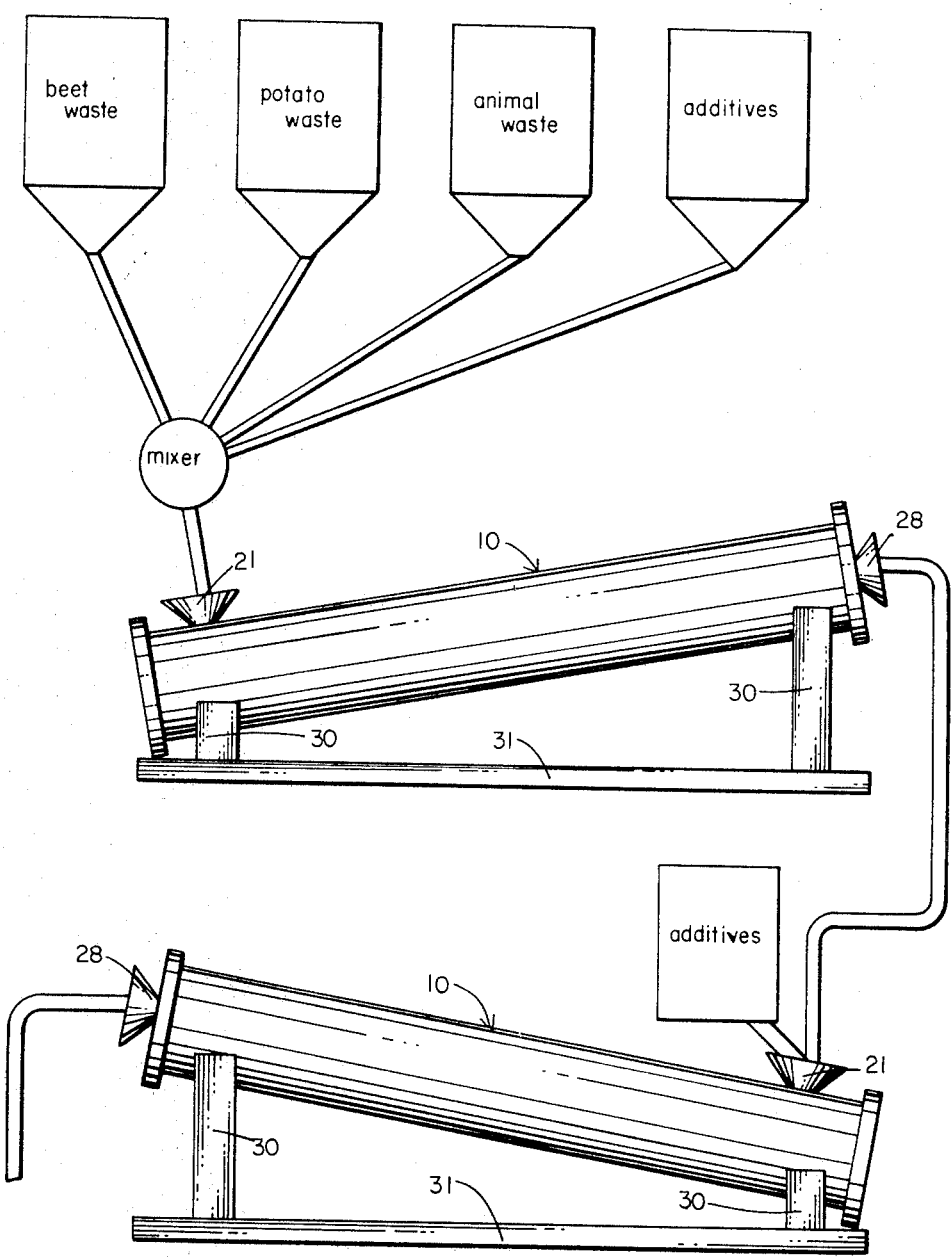
FIG. 6 is a flow sheet type diagram of our process indicating the various steps and apparatus involved.

The cooking tunnel shown in FIG. 1 is the only apparatus in our invention that differs from known commercially available devices. This apparatus may be used for cooking or dehydration and is adapted to be inserted in an existing continuous production line. The apparatus includes, generally, outer elongate steam jacket 11 enclosing internal processing chamber 12, which in turn encloses auger 13 and journals it for rotation relative to housing 11.

Steam jacket 11 is a cylindrical pipe with outer enclosing wall 16 inwardly adjacent cylindrical shell-like steam chamber 17. Adjacently inward, cylindrical inner chamber wall 18, is supported by appropriate web-like structure 14 in structural engagement with the outer cylindrical wall 16 to define the product chamber. This member may be formed of plural units of relatively short length joined to provide the entire structure, to aid in manufacture, assembly and handling, but the elongate unit illustrated in FIG. 1 is preferred.

Plate 19 encloses the rearward end portion of steam chamber 17 and inner processing chamber 18; similar forward plate 20 encloses the forward portion of the two chambers. Each of these plates 19, 20 has appropriate appurtenances for cooperation with the various bearings, steam structures and gates hereinafter required, and is preferably joined in its structural environment by welding 15.

The rearward portion of auger 13 is rotatably journaled by bearing 22, carried in rearward end plate 19 by bearing flange 23. Steam fitting 24 is carried in plate 19 to allow steam access to the steam chamber 17. The forward portion of auger 13 is rotatably journaled in bearing 25 supported in spider type bearing flange 26 carried by end plate 20 to permit passage of material in the processing cylinder through the spider support to exit. Forward end plate 20 is provided with product exit port 28 operatively carrying gate valve 29 to regulate flow of product therethrough.

Forward release valve 27 is positioned at the apex of the steam chamber 17 to permit excess steam escape and maintain appropriate pressure within the steam chamber.

The entire cooking cylinder structure 10 is supported by depending flanges 30 upon some solid stable supporting surface 31, with the forward extension of the cylinder inclined upward, as illustrated in FIG. 1, to enlist gravity to aid in compacting material passing therethrough.

Auger 13 has central cylindrical pipe-like body 32 with forward and rearward ends closed by plates 33 to define an internal steam chamber. The end plates carry jack shafts 34 to cooperate with bearings 22, 25 to rotatably journal the member within the processing chamber. Screw 35 of auger is positioned on the external surface of body 32.

This screw member is of a triangular cross-sectional shape, illustrated in FIG. 2, with progressively increasing pitch in its forward progression along the body 32, so that it has longer pitch in the rear of the member and the shorter pitch in the forward part, again to provide a compacting action of material as it proceeds along the auger.

The auger and internal processing chamber 18 are appropriately sized relative each other so that there is some slight clearance between the two members to allow material to pass over the screw of auger member 35.

This inefficient conveyor type structure allows material to pass, in a somewhat restricted fashion, between the auger and processing chamber walls, to mix it into a more or less homogeneous mass and reduce it to relatively small particulated nature, much the same as an animal would do in the preliminary digestive process. Obviously the relationship between auger and chamber walls is rather critical and will necessitate individual design. In a chamber of approximately fourteen inch diameter and twenty-four foot length, and with an auger with an average pitch of about two feet, rotation between one and ten revolutions per minute, we find a one fourth inch clearance between auger and chamber to be desirable.

If more mixing or mastication than provided by the foregoing structure is necessary, a compound auger of the type illustrated in FIG. 3 may be used. Here the auger spirals are discontinuous, with each spiral moved closer to its adjacent mate to allow more spiral surface and greater action about spiral ends.

A steam heat exchange system to heat the processing chamber is shown in FIG. 4. It includes boiler 38 communicating through inlet valves 37 to steam jacket and auger, with exhaust communicating through condenser 39 and pump 40 back to the boiler. Steam is a useful and economic heating means if processing temperatures above 450 degrees Fahrenheit are not desired; it gives a constant temperature ot 400 p.s.i. throughout the steam chamber.

A liquid heated chamber as shown in FIG. 5 is desirable if higher temperatures or gradients be desired in the heating chambers. Many liquid heat exchange mediums are known any may be used in a system including heat exchanger 41 communicating through inlet valves 37 to the steam jacket and auger, and upon exiting through thermostat 42 back to heat exchanger 41. Heat is provided to exchanger 41 by heating device 43 controlled by thermostat 42. This heating system can easily supply temperatures up to 800 degrees Fahrenheit and of a gradient nature as indicated by the generalized temperature graph beside the cooker in FIG. 5.

An injection system for steam, inert gas or other gaseous additives desirable in the cooking chamber during processing is provided through the line 44 controlled by valve 45 and communicating with the source (not shown) of appropriate gaseous product.

With the foregoing description of the apparatus of our invention the process can now be understood, particularly with reference to the flow diagram of FIG. 4:

In the western part of the United States, and particularly in the Columbia River Basin, there is a surplus of animal and vegetative wastes that have not been useful, or at least have not been useful in the economic sense. Principal among these wastes are the tops and pulp from sugar beets after the sugar has been expended, potatoes of a cull variety and scraps from potato processing, apple pulp and cannery waste and blood and similar offal from slaughtering activities. All of these various wastes have either existing or convertible protein, carbohydrate and fat content that may be made useful as an animal food. Our process seeks to make these products more useful with aid of the apparatus described.

In dealing with this waste, it has been found most advantageous to provide certain additives to render it palatable and most biologically useful as an animal feed and to process it by cooking to render its components most useful. This cooking process, when carried out with the apparatus we have conceived, serves also to admix the various components into a homogeneous whole, masticate the product, partially carbonize it, and permit the use of dehydrated components and the dehydration of product.

It has been found advantageous to dehydrate, at least partially, the various waste components used in our process. This reduces the bulk of the components by removing parts not particularly useful, renders them easier to handle and store and prevents spoilage and putrification. This also allows for storage of components to provide a relatively continuous operation of our process when supplied from a discontinuous source of supply. The dehydration of components may be carried out by ordinary commercial dehydration apparatus, or, if preferred, by an apparatus similar to that specified for cooking our product.

After dehydration the various waste products and such additives as desired are fed into a cooker, of the type illustrated in FIG. 1, through the input feeding orifice 21. The mass of material is moved by the appropriately rotating auger 13 in a forward direction. Since the auger does not fit snugly within the processing chamber, material will be allowed to pass over the outward surface of screw member 35 and become admixed and masticated in its passage through this chamber.

Since the pitch of the spiral of the auger member 35 increases as it moves in a forward direction, the material carried in the processing chamber will tend to be moved faster in the forward part of the chamber than in the rearward part and by reason of this it will be compacted. The transfer of heat through the material is somewhat proportional to its compaction or density and thusly more heat will be transferred through and into the processed material in the forward part of the chamber than in the rearward part so that in this area product temperature will be effectively increased. The amount of material exiting from the chamber may be regulated by gate valve 29 at exit port 28 to further aid in the maintaining of an appropriate compaction of the material in the forward-most part of the processing chamber.

If during the processing it is necessary to add moisture to the product mass this may be done by injection of steam through the port 36 upon appropriate regulation of valve 37. If the initial products be too completely dehydrated it may be necessary to add some moisture to them in the processing though this is unlikely when a relatively dehydrated finished product is desired.

In the processed feed it is desirable that there be a certain amount of carbonaceous matter in the form of charcoal. Some of the components of our process may be effectively carbonized during the cooking process by raising the temperature sufficiently and maintaining a partial pressure of inert gas, such as nitrogen, in the processing chamber to prevent a complete carbonization. Nitrogen may be introduced into the system through the port 36 and regulating valve 37 from an appropriate source (not shown). This charcoal serves to adsorb some of the gases normally produced in the animal digesting process and tends to prevent bloat in ruminants and similar digestive problems in the non-ruminants. This additive is especially desirable in a concentrated food of relatively high food value per unit of volume such as normally produced by our process.

The compaction of material in the forward part of processing chamber 12 is a necessary and essential part of our invention as it allows the matter being processed to be cooked at a progressively high temperature for a relatively short period of time. If this cooking or temperature be extended over the entire processing chamber or be carried out for a longer period of time—as that required for the material to pass through the entire chamber improper product passage and cooking will result with unwanted scorching or carbonization of the product on the processing chamber walls.

During the initial cooking process it may be desirable to add various additional components such as oils and fats or saccharides such as molasses. This may be done in a second cooking stage, if desired, since these products may be deleteriously effected by prolonged cooking or high temperatures if carbonization be used. The more volatile components of fats or oils may be vaporized if they be cooked at too high a temperature and molasses tends to carbonize in the cooking area if it be cooked at too high a temperature for too long a time. These products are therefore preferably added after the initial cooking of the mass so that the processing times and cooking temperatures may be appropriately regulated.

We have found in the use of our invention that molasses does not carbonize if it be cooked for a relatively short period of time even at relatively high temperatures, but yet it may be sufficiently dehydrated to give a relatively dehydrate final product. Oils and fats aid the passage of product through the processing chamber, apparently by lubricating the containing surfaces, but generally sufficient quantities of this component are present in the animal offal for the initial cooking stage.

After the final cooking and mixture of additives the product may be caked, pelleted, powdered, or otherwise formed into a product for consumption. Feed for various animals is preferably differently configured by processes well known in the animal feeding arts to be most palletable to the different animals.

It is to be noted that in treating material by our process a relatively high temperature may be maintained which is normally sufficient to physically destroy various deleterious pesticide, herbicides and chemical residues in the matter being processed, so that such substances will not be carried over into the final animal feed in a biologically active condition to deleteriously effect the ultimate consumers of the feed.

It should be further noted that the elevated temperatures of our process are sufficient to destroy most or all of the normal micro-flora, yeasts and micio-fauna commonly present in the waste products involved to prevent spoilage of the feed and any biological activities of these potential invaders in potential hosts.

It should be further noted that temperatures may be sufficiently raised in the heating process to destroy the viability of various noxious weed seeds or other seeds that might be passed from consuming animals and thereafter vegetatively re-established. This is a most desirable feature of our invention as it allows the use of screenings and weed seeds of various types that have both nutritional value and roughage most desirable in a finished product.

It is further to be noted that in using our process with the particular apparatus specified, not only is the foregoing cooking accomplished but also appropriate carbonized matter may be formed from the components, all components are substantially homogeneously mixed and all are reasonably masticated. This mastication is of particular importance in the feeding of a highly nutritive food to non-ruminants; normally additional roughage will be needed by ruminants to function normally with the food of our process.

A typical formulation of feed produced by our process would be as follows:

| | Maximum percent |
|---|---|
| Carbonized matter | 5 |
| Dehydrated potato scraps and culls | 50 |
| Dehydrated blood and slaughter-house offal | 25 |
| Dehydrated sugar beet pulp | 25 |
| Oils and fats | 3 |
| Cellulose material for roughage | 50 |
| Additives including molasses, mineral salts and medications according to prescription formulation. | |

The above formulation is well adapted as a feed for swine. Obviously the carbohydrate and protein values, relative to roughage and each other, may be appropriately adjusted in this formula by principals well known in the husbandry arts to allow greatest benefits from use of the feed for other types of animals.

The cellulose material is preferably chosen from some types of chopped vegetable matter such as hay, wheat seed screenings, silage and the like for economy and animal palatability. Enough roughage must be provided to maintain normal activity in ruminants being fed our material.

To make the combination somewhat more paletable to animals, and more nutritionally advantageous, preferably a small amount of salt and five to fifteen percent (5–15%) of molasses may be added to the product after initial cooking. This may be surface coated on a pelletized product if desired.

This particular formulation of product, if carbon as such is added, is preferably processed at a temperature between two hundred twenty and two hundred seventy degrees Fahrenheit, with a total average elapsed time of any particular mass of product in the initial cooking cylinder of approximately ten to fifteen minutes.

To provide the cooking limits specified we have found the ratio of product volume to heat transfer surface in our apparatus should vary substantially between 0.05 to 0.20, with specific ratios of 0.16 for apple pulp, blood and higher protein matter, 0.10 to 0.12 for potatoes and starchy matter, and 0.08 for beans, other legumes and weed seed.

Preferably some fat as aforesaid is maintained in the initial cooking stage to aid in lubrication and, at these temperatures, the molasses may be included in a first cooking stage if desired. If components are to be carbonized in the process, preferably it will be carried out in two stages—a first stage for desired carbonization and a second cooking stage as aforesaid, if necessary.

The foregoing description of our invention is necessarily of a detailed nature so that a specific embodiment of it may be set forth as required, but it is to be understood that the description is only a specific embodiment and that various modifications of detail, rearrangement and multiplication of parts and substitution of steps may be resorted to without departing from its spirit, essence or scope.

Having thusly described our invention, what we desire to protect by Letters Patent, and what we claim is:

1. A process for making a higher nutritional animal food from lower nutritional waste products containing both vegetable wastes and animal offal comprising the steps of:
   mixing and masticating said material to a substantially homogeneous particulated mass in an elongate chamber having an inefficient rotary auger with progressively increasing pitch therein, said auger permitting material by-pass between said auger and said chamber; and
   heating said material in said chamber in proportion to its progression through said chamber, by reason of its greater heat transfer resulting from greater material compaction, to heat said material to render its animal nutritive content higher and destroy deleterious matter therein.

2. The process of claim 1 wherein said material is raised from an initial temperature of between fifty and ninety degrees Fahrenheit upon entry into said chamber to a final temperature of between two hundred ten degrees and three hundred fifty degrees Fahrenheit upon its exit therefrom in a period of ten to fifteen minutes.

3. The process of claim 1 further characterized by:
   a partial inert gas atmosphere in said chamber; and
   heating temperatures adapted to partially carbonize carbonaceous matter in said chamber.

4. The process of claim 1 further characterized by said chamber being inclined upward from an imput to a spaced output to cause gravity force on material in said chamber tending to compact said material.

5. The process of claim 1 further characterized by said waste material being combined in the proportion of:

| | Maximum percent |
|---|---|
| Carbonaceous matter | 5 |
| Potato culls and waste | 50 |
| Dehydrated blood and slaughter house offal | 25 |
| Dehydrated sugar beet pulp | 25 |
| Cellulose materials | 50 |

6. The process of claim 1 further characterized by said waste material being combined in the priportion of:

| | Maximum percent |
|---|---|
| Carbonaceous matter | 5 |
| Potato culls and waste | 50 |
| Dehydrated blood and slaughter house offal | 25 |
| Dehydrated sugar beet pulp | 25 |
| Cellulose material | 50 |

Additive materials selected from group of saccharides, mineral salts and medications according to prescriptive formulations.

References Cited
UNITED STATES PATENTS

| | | | |
|---|---|---|---|
| 1,130,149 | 3/1915 | Conway | 99—149 |
| 1,354,068 | 9/1920 | Taylor | 99—149 |
| 1,877,266 | 9/1932 | Chapin et al. | 99—235 |

A. LOUIS MONACELL, Primary Examiner

R. M. ELLIOTT, Assistant Examiner

U.S. Cl. X.R.

99—2, 149